United States Patent
Sohmshetty et al.

(10) Patent No.: US 8,706,282 B2
(45) Date of Patent: Apr. 22, 2014

(54) WELDABILITY PREDICTION AND RECOMMENDATION SYSTEMS AND METHODS

(75) Inventors: Raja Shekar Sohmshetty, Canton, MI (US); Theodore Coon, Livonia, MI (US); Saravanan Subramanian, Belleville, MI (US); Zhiyong Cedric Xia, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1039 days.

(21) Appl. No.: 12/685,886

(22) Filed: Jan. 12, 2010

(65) Prior Publication Data

US 2011/0172796 A1 Jul. 14, 2011

(51) Int. Cl.
*G06F 19/00* (2011.01)
*B23K 37/00* (2006.01)

(52) U.S. Cl.
USPC ........... 700/103; 700/95; 219/137 R; 706/903

(58) Field of Classification Search
USPC ......... 700/28–36, 95–98, 103–105, 108–110; 219/136, 137 R; 706/21, 45–48, 903, 706/904, 919, 920; 703/1, 2
See application file for complete search history.

(56) References Cited

U.S. PATENT DOCUMENTS

| | | | | |
|---|---|---|---|---|
| 5,202,837 A * | 4/1993 | Coe et al. | | 700/98 |
| 5,729,463 A * | 3/1998 | Koenig et al. | | 700/98 |
| 5,910,894 A * | 6/1999 | Pryor | | 700/95 |
| 6,018,729 A | 1/2000 | Zacharia et al. | | |
| 6,560,500 B2 * | 5/2003 | St. Ville | | 700/98 |
| 6,636,776 B1 * | 10/2003 | Barton et al. | | 700/169 |
| 6,766,206 B1 * | 7/2004 | Jasuja et al. | | 700/98 |
| 6,789,051 B1 * | 9/2004 | Chen et al. | | 703/2 |
| 6,912,447 B2 * | 6/2005 | Klimko et al. | | 700/212 |
| 7,127,304 B1 * | 10/2006 | Gould et al. | | 700/20 |
| 7,127,438 B2 * | 10/2006 | Monari | | 706/21 |
| 7,132,617 B2 | 11/2006 | Lee et al. | | |
| 7,194,447 B2 * | 3/2007 | Harvey et al. | | 706/45 |
| 7,203,628 B1 * | 4/2007 | St. Ville | | 703/1 |
| 7,244,905 B2 * | 7/2007 | Das et al. | | 219/109 |
| 7,318,011 B2 * | 1/2008 | Subrahmanyam | | 703/1 |
| 7,655,880 B2 * | 2/2010 | Auger et al. | | 219/110 |
| 2002/0134816 A1 * | 9/2002 | Chen et al. | | 228/103 |
| 2005/0043934 A1 * | 2/2005 | Hartmann et al. | | 703/2 |

(Continued)

OTHER PUBLICATIONS

Maximizing Weldability Lobes, Huys Technical Library #22.

(Continued)

*Primary Examiner* — M. N. Von Buhr
(74) *Attorney, Agent, or Firm* — Damian Porcari; Brooks Kushman P.C.

(57) ABSTRACT

In one or more embodiments, a weldability of a stack-up for use in vehicle part production may be determined. The determination may include receiving general stack-up information, welding standards data for forming a stack-up, and one or more inputs defining one or more stack-up design variables. Additionally, standardized stack-up information may be generated based on the general stack-up information, the one or more design variables, and the welding standards data. Furthermore, historical welding data may be received for predicting a weldability of the stack-up. Predictive logic may be applied to the standardized stack-up information based on the historical welding data to obtain one or more weldability predictions for the stack-up. The one or more weldability predictions may be transmitted for use in vehicle part production.

21 Claims, 6 Drawing Sheets

(56) References Cited

U.S. PATENT DOCUMENTS

| | | | |
|---|---|---|---|
| 2006/0129257 A1* | 6/2006 | Chen et al. | 700/96 |
| 2008/0021604 A1* | 1/2008 | Bouvier et al. | 701/30 |
| 2008/0183311 A1* | 7/2008 | MacArthur et al. | 700/29 |
| 2010/0023150 A1* | 1/2010 | Cai et al. | 700/103 |
| 2010/0065533 A1* | 3/2010 | Buda et al. | 219/110 |
| 2010/0121472 A1* | 5/2010 | Babu et al. | 700/104 |
| 2011/0208681 A1* | 8/2011 | Kuecuekyan | 706/21 |

OTHER PUBLICATIONS

Optimizing Weld parameters, Huys Technical Library #12.
SORPAS brochure, Swantec Software and Engineering ApS, 2009.
Resistance Welding Software—Spot, Projection, Butt, Micro Welding, printout from www.swantec.com, Sep. 22, 2009.
N. Scotchmer, et al., Saving Time and Money with Resistance Welding Simulation Software, May 19, 2004.

* cited by examiner

WELDABILITY PREDICTION AND RECOMMENDATION SYSTEMS AND METHODS

BACKGROUND

1. Technical Field

Various embodiments relate to methods and systems for determining the weldability of a plurality of materials for use in vehicle part production. In at least one embodiment, the method and system predicts a weldability and recommends a weld process schedule.

2. Background Art

There are various examples of spot welding techniques used in the automotive industry for constructing automotive body structures. One example is resistance spot welding (RSW). Spot welding generally includes the welding together of two or more sheets of metal to form a "stack-up." The stack-up is then used in constructing one or more parts for a vehicle.

The field includes various examples of techniques and tools that are used to accomplish spot welding and improve spot welding results. For instance, SORPAS (manufactured and distributed by Swantec) is a spot welding software tool that utilizes welding simulations in designing resistance welding parts and joints, generating welding parameters, and optimizing welding parameters for various conditions in production. SORPAS utilizes physics and mathematics models in making its determinations.

U.S. Pat. No. 6,018,729 issued to Zacharia et al. discloses a neural network used to control a spot welding process. A spot welding process includes a neural network for processing current and voltage energizing a weld in progress. The neural network generates a predicted time of optimal weld strength and/or nugget size for the weld in progress. A controller terminates the weld in progress at the predicted time. A method for controlling a spot welder includes sensing in real time current and voltage energizing a spot weld in progress; predicting a time of optimal weld strength and/or nugget size with a neural network responsive to the sensed current and voltage; and terminating the weld in progress at the predicted time. A sensor for electromotive forces (EMF) induced by the spot welder can generate a signal for canceling out a large fraction of EMF components in at least one or both of the current and voltage signals. EMF components are substantially precluded in the current signal if the current sensor uses a buried shunt. Termination of the weld in progress at the predicted time is prevented when the predicted time precedes a predetermined minimum weld duration. The weld in progress is terminated at a predetermined maximum weld duration when the predicted time is after the predetermined maximum weld duration.

U.S. Pat. No. 7,132,617 issued to Lee et al. discloses a method and system for assessing quality of spot welds. A system and method for assessing the quality of spot weld joints between pieces of metal includes an ultrasound transducer probing a spot weld joint. The ultrasound transducer transmits ultrasonic radiation into the spot weld joint, receives corresponding echoes, and transforms the echoes into electrical signals. An image reconstructor connected to the ultrasound transducer transforms the electrical signals into numerical data representing an ultrasound image. A neural network connected to the image reconstructor analyzes the numerical data and an output system presents information representing the quality of the spot weld joint. The system is trained to assess the quality of spot weld joints by scanning a spot weld joint with an ultrasound transducer to produce the data set representing the joint. The system then physically deconstructs the joint to assess the joint quality.

SUMMARY

One aspect includes a computer-implemented method for determining a weldability of a plurality of layers of materials forming a stack-up used in vehicle part production. The computer-implemented method may include receiving general stack-up information, welding standards data for welding together a plurality of materials forming a stack-up, and one or more inputs defining one or more design variables of the one or more stack-ups. The general stack up information may be one or more general CAD models of stackups. Furthermore, the one or more design variable inputs may be user inputs. The one or more design variables may be selected from the group consisting of grade, gauge, coating, supplier, and number of stack-up layers.

The method may further include generating standardized stack-up information based on the general stack-up information, the one or more design variables, and the welding standards data. The standardized stackup information may be one or more standardized CAD models of the stackups.

In one embodiment, the one or more design variables may be converted to one or more physical property variables. The physical property variables may be selected from the group consisting of yield strength, modulus, chemical composition, thermal composition, heat capacity, surface resistivity, bulk resistivity, surface coating material, and surface coating thickness.

The computer-implemented method may further include receiving historical welding data for predicting a weldability of the stack-up. A predictive logic may be applied to the standardized stack-up information based on the historical welding data to obtain one or more predictions on the weldability of the stack-up. Furthermore, one or more welding process variables may be generated based on the historical welding data. The one or more welding process variables may be selected from the group consisting of weld force, weld time, weld current, controller type, electrode type, and electrode diameter.

The method may further include transmitting the one or more weldability predictions of the stack-up for use in vehicle part production.

In one embodiment, the computer-implemented method may further include receiving one or more inputs for recommending one or more weld process schedules for the stack-up. The weld process schedules may be based on the one or more weldability predictions. One or more weld process schedules may be recommended and, in some embodiments reported, based on the one or more inputs and the welding standards data.

In certain embodiments, the method may further include generating one or more weldability prediction variables. The one or more inputs for recommending one or more weld process schedules may be the one or more weldability prediction variables. The one or more weldability prediction variables may be selected from the group consisting of weld force, indentation, hardness, strength, fatigue, and electrode life.

In certain embodiment, the method may further include determining a weld quality index based on the one or more weldability predictions. Furthermore, the weld quality index may be reported.

Another aspect may include a computer-implemented system for determining a weldability of a plurality of layers of materials forming a stack-up for use in vehicle part production. The computer-implemented system may include at least one computer. The at least one computer may be configured to receive general stack-up information, welding standards data for welding together a plurality of materials forming a stack-up, and receive one or more inputs defining one or more design variables of the one or more stack-ups.

The at least one computer may be further configured to generate standardized stack-up information based on the general stack-up information, the one or more design variables, and the welding standards data.

The at least one computer may be further configured to receive historical welding data for predicting a weldability of the stack-up. In one embodiment, the historical welding data may comprise one or more learning models. In other embodiments, the historical welding data may include data from one or more manufacturing plants. The data from the one or more manufacturing plants may include at least one of weld quality data, optimal process parameters, weld equipment data, or welding tip maintenance data.

The at least one computer may be further configured to apply predictive logic to the standardized stack-up information based on the historical welding data to obtain one or more predictions on the weldability of the stack-up.

The at least one computer may be further configured to transmit the one or more weldability predictions of the stack-up for use in vehicle part production.

The computer-implemented system may further include a historical welding database for storing the historical welding data. In at least one embodiment, the at least one computer may be further configured to received the historical welding data from the historical welding database.

Another aspect may include a method comprising receiving general stack-up information, welding standards data, physical property variable inputs for a stack-up, and historical welding data for making a weldability prediction. In at least one embodiment, the physical property variable inputs may be generated from one or more design variables input by a user.

The method may further include generating standardized stack-up information based on the inputs. In one embodiment, generating the standardized stack-up information may include generating one or more welding process variables.

The method may further include applying predictive logic to the standardized stack-up information to obtain one or more weldability predictions. The method may further include transmitting the weldability predictions for use in vehicle part production.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

A stack-up may include a number of metals having different characteristics. For example, metals may be of low strength or high strength and/or coated or uncoated. As such, certain metals may be more "weldable" together than others. However, determining and confirming which metals are weldable can be an arduous task due to the shear number of metals that can be welded together. Accordingly, cost and time associated with manufacturing vehicles can increase significantly for an OEM just during the design phase. For example, selecting the proper metals that can be welded may include extensive experimentation and "trial and error" before an optimal weld is found.

Figure 1:
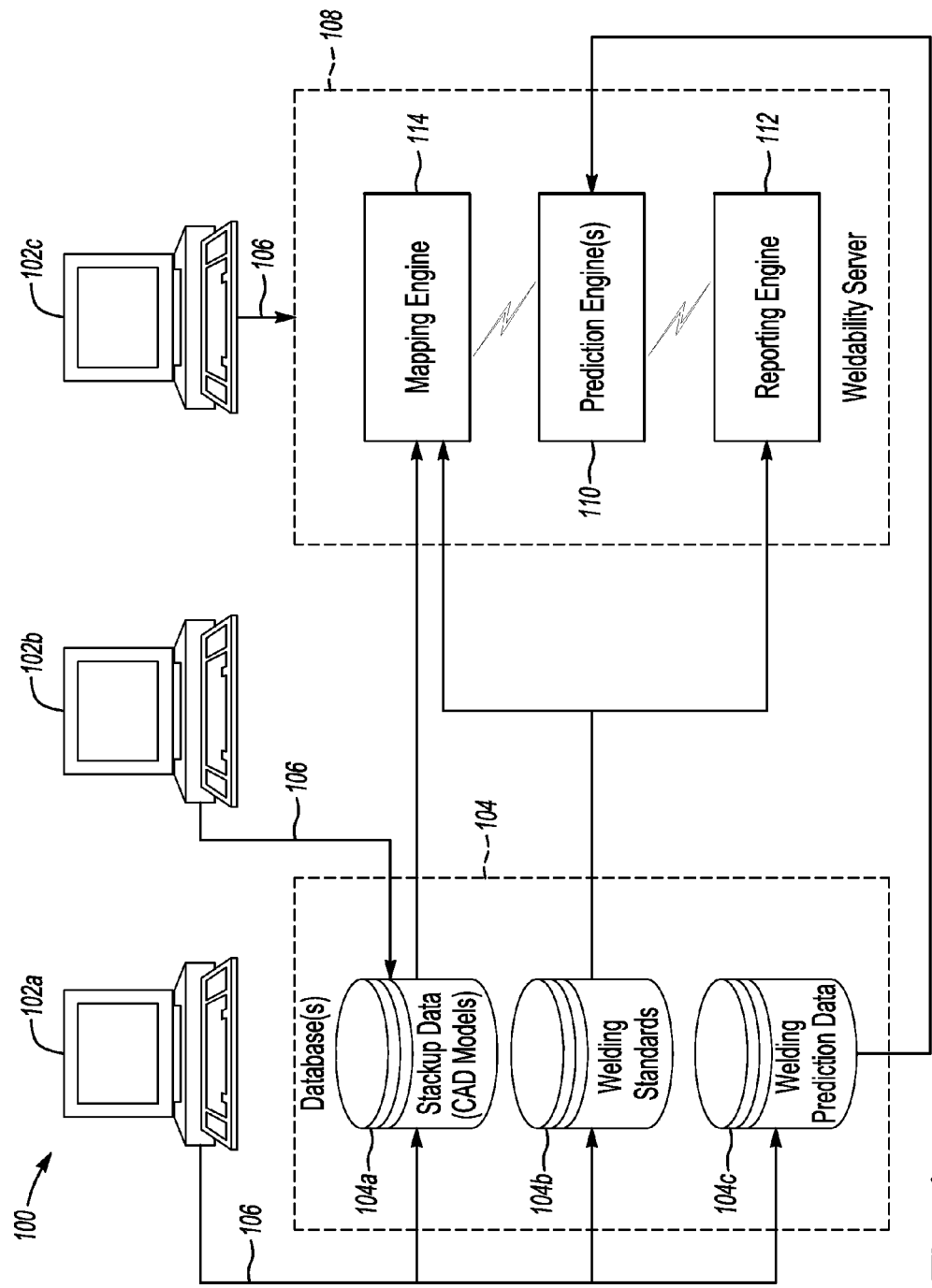
FIG. 1 illustrates an exemplary computerized system used in a weldability determination.

FIG. 1 illustrates one embodiment of a computerized system that may be used to determine a weldability of one or more stackups during vehicle design. It should be understood that the arrangement of FIG. 1 is illustrative and provided for clarity. Features may be re-arranged and modified without departing from the scope of one or more embodiments of the invention. In one embodiment, system 100 may comprise an artificial neural network for predicting the weldability of stackups.

The system 100 may include a number of computer terminals 102a, 102b, and 102c which may be used by a number of individuals associated with an original equipment manufacturer (OEM). In one embodiment, the OEM may be a vehicle manufacturer. Non-limiting examples of users may include administrators, participants and general users.

Administrators (e.g., terminal 102a) may include individuals responsible for administration of the system 100. Non-limiting examples of responsibilities may include, but are not limited to, review of data input into database 104 and reconfiguring predictive algorithms (described below) in order for system 100 to relearn weld predictions. The administrator may also manage user access to system 100. For example, administrators may provide authorization to, and determine the authorization level of, one or more general users of system 100.

Participants (e.g., terminal 102b) may be a member of a design division of an OEM, a manufacturing division of an OEM, or the like. Participants may view, update, and manage data in database 104a.

General users (e.g., terminal 102c) may be end users (e.g., and without limitation, design engineers). For example, the general users may receive weldability predictions and recommendations for one or more stackups. The recommendation process will be described below.

Database 104 may include a number of databases. For instance, database 104a may be a database of stackup data (e.g., and without limitation, CAD models of stackups). Database 104b may include welding standards which may be defined and redefined by the OEM. Database 104c may include the models of predictive logic based on historical welding data (i.e., data from previous welds).

Terminals 102a and 102b may be in communication with database(s) 104 over a network communication link 106 (e.g., and without limitation, LAN, WAN, or Intranet). Communication may be wired (e.g., and without limitation, Cable, DSL, or dial-up) or wireless (e.g., and without limitation, WiFi or Wimax). In one embodiment, the system 100 may be a web-based system such that weldability data is transmitted and received via a web server (which may or may not be weldability server 108). In a further embodiment, the weldability system 100 may be a web-based system operating in a distributed network environment.

Weldability server 108 may have installed a number of software engines for generation and transmission of weldability predictions and recommendations to a general user (e.g., at terminal 102c). Prediction engine(s) 110 may use predictive logic, based on welding prediction data (e.g., historical welding data), to determine one or more weldability predictions. Specifically, prediction engine(s) 110 may determine whether a stackup is weldable using predictive logic based on historical welding data. As stated above, the welding prediction data (i.e., learning models) may be input to database 104c.

In one embodiment, prediction engine(s) 110 may be comprised of one or more further engines. Thus, as will be described below, weldability predictions may occur in one or more steps. As a non-limiting example, prediction engine(s) 110 may be comprised of at least two engines. One engine may utilize the welding prediction data, in conjunction with user inputs (as described below), to obtain values for the welding process (process variables). A second engine may utilize the user inputs and process variables to obtain a weldability prediction (response variables). Non-limiting examples of process variables and response variables are described below in Table 1.

In a further embodiment, where system 100 is an artificial neural network, prediction engine(s) 110 may be an artificial neural network program for controlling the behavior of the artificial neural network. The program may be standard, off-the-shelf artificial neural network software.

Reporting engine 112 may compile and organize the data from prediction engine(s) 110 for generating one or more weldability prediction reports. The report(s) may be displayed to the general user on terminal 102c.

Reporting engine 112 may also recommend one or more weld process schedules for a stackup. The weld process schedule recommendations may be based on the weldability predictions determined by prediction engine(s) 110. For example, prediction engine(s) 110 may generate a number of response variables based on the one or more user inputs and the process variables. These response variables may constitute the prediction engine's 110 prediction of a stackup's weldability. Non-limiting examples of response variables are described in Table 1. Reporting engine 112 may utilize the response variables as input(s) to recommend one or more weld process schedules for one or more stackups. Further details of the recommendation process will be described below with respect to FIG. 2.

In one embodiment, a mapping engine 114 may be utilized for mapping one or more user inputs. User inputs may include design variables of the stackups. Non-limiting examples are described in Table 1. A stackup is generally comprised of two or three sheets (i.e., has a thickness of 2T or 3T) of material (e.g., steel) although more may be utilized.

Mapping engine 114 may or may not map or "translate" the design variables into one or more physical property variables.

Figure 4A:
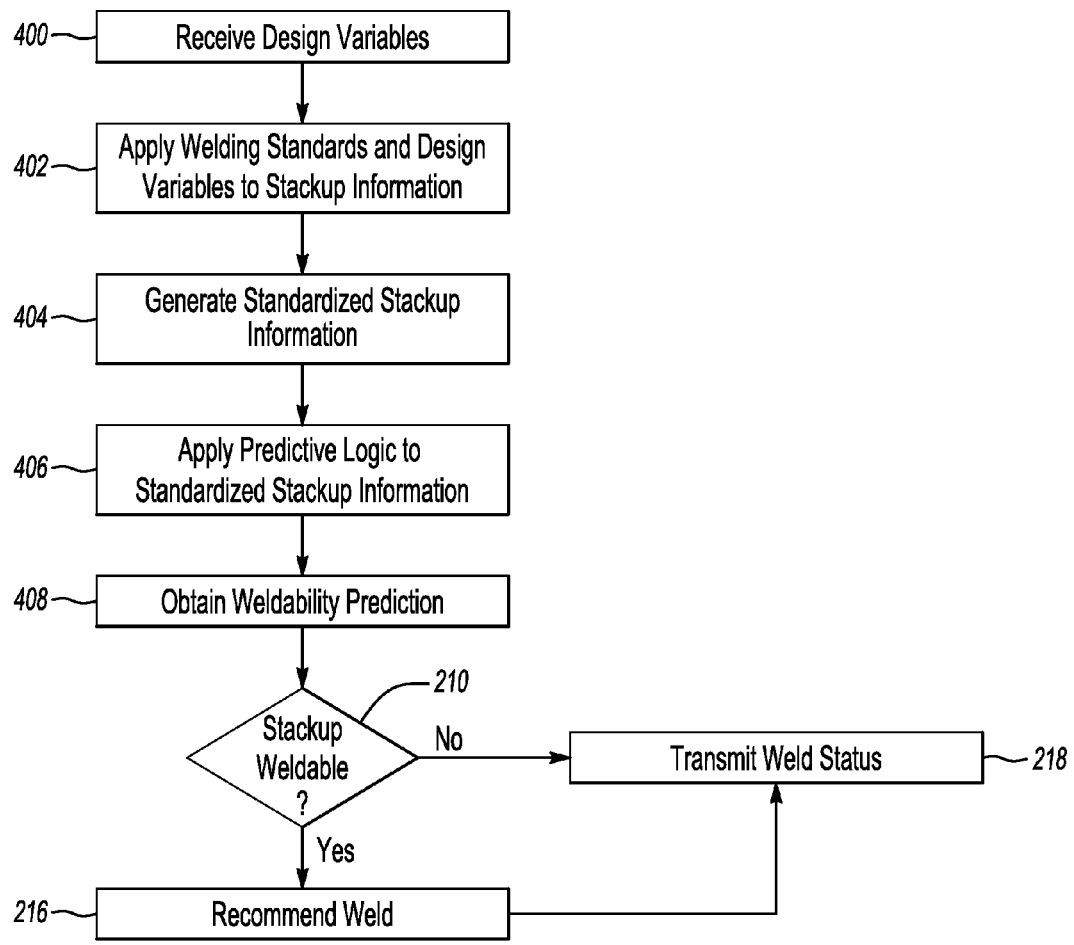
FIGS. 4A and 4B illustrate two embodiments of the various embodiments of the weldability prediction operation.
Figure 4B:
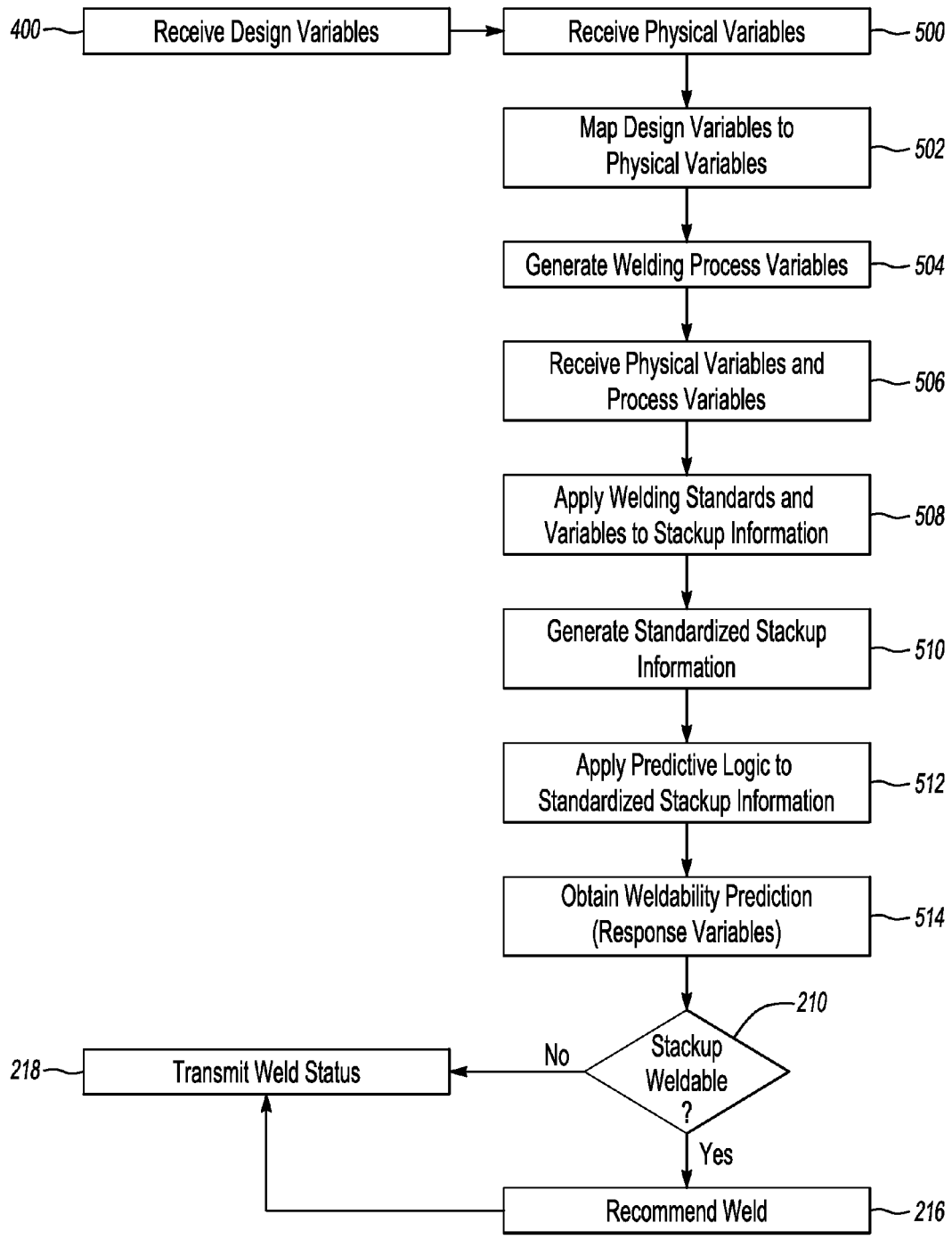

As is known in the art, the efficacy of an artificial neural network may increase with the amount of data with which it is "trained." Thus, this translation may occur in order to obtain more robust results from the artificial neural network. However, it should be understood that the system 100 may use design variables, physical property variables and/or any number or combination of design variables and/or physical property variables as inputs to prediction engine(s) 110 without departing from the scope of the invention. FIGS. 4A and 4B below illustrate two non-limiting, varied methods for predicting a weldability of a stackup. Non-limiting examples of physical property variables are described below in Table 1.

TABLE 1

| Design Variables | Physical Property Variables | Process Variables | Response Variables |
|---|---|---|---|
| A. Upper Sheet<br>1) Grade<br>2) Gauge<br>3) Coating<br>4) Supplier<br>B. Middle Sheet<br>1) Grade<br>2) Gauge<br>3) Coating<br>4) Supplier<br>C. Lower Sheet<br>1) Grade<br>2) Gauge<br>3) Coating<br>4) Supplier<br>D. 3T or 2T | A. Yield Strength<br>B. Modulus<br>C. Chemical Composition<br>D. Thermal Composition<br>E. Heat capacity<br>F. Surface Resitivity<br>G. Bulk resistivity<br>H. Surface coating material<br>I. Surface coating thickness | A. Weld force<br>1) Lower<br>2) Optimal<br>3) Upper<br>B. Weld time<br>1) Lower<br>2) Optimal<br>3) Upper<br>C. Weld current<br>1) Lower<br>2) Optimal<br>3) Upper<br>D. Controller Type<br>1) AC<br>2) DC<br>3) Adaptive<br>E. Electrode Type<br>1) ISO<br>2) Spherical<br>3) Truncated<br>F. Electrode Diameter | A. Weld Geometry<br>1) Width<br>2) Penetration Upper<br>3) Penetration Lower<br>B. Indentation<br>1) Upper<br>2) Lower<br>C. Hardness: Base material, heat-affected zone (HAZ), fusion zone<br>1) Upper<br>2) Middle<br>3) Lower<br>D. Strength<br>1) Shear tension<br>2) Cross tension<br>3) Peel<br>E. Fatigue<br>F. Electrode life |

As an example of the mapping process, the grade of each sheet (e.g., upper sheet, middle sheet and/or lower sheet) may be mapped to one or more of the physical property variables. As such, a general user may input the grade of one or more stackup sheets to a graphical user interface (GUI) page, such as one illustrated in FIG. 3. Consequently, mapping engine 114 may map the stackup sheet grade with one or more of the physical property variables during the weldability determination process. In one embodiment, mapping may occur before prediction engine(s) 110 predict the weldability of the stackup. It should be understood that one or more design variables, in any combination, may be input to the GUI page and mapped to the one or more physical property variables. Further details of the GUI page will be described below with respect to FIG. 3.

In one embodiment, one or more filter engines may be used for filtering data before or after a weldability prediction is made. The one or more filter engines may be used to determine which conditions are to be satisfied as part of the welding process. If the condition is satisfied, that condition may be used as part of the welding prediction and/or recommendation process. Otherwise, the condition is not used.

As a non-limiting example, outputs from one or more of engine(s) 120, 122, 124 may be fed into filtering engine to determine whether particular predefined conditions have been satisfied. If so, the results may be displayed to the general user at terminal 102c. A non-limiting example of a predetermined condition may be a range of one or more acceptable design variables based on the welding standards defined by the OEM.

It should be understood that engines 110, 112, 114 illustrated in FIG. 1 are represented as separate components for clarity purposes to illustrate the various functions of the weldability server. It should not be considered a limiting arrangement. For example, and without limitation, weldability server 108 may have installed a single software tool having programmed instructions for performing the operations described throughout this disclosure.

Figure 2:
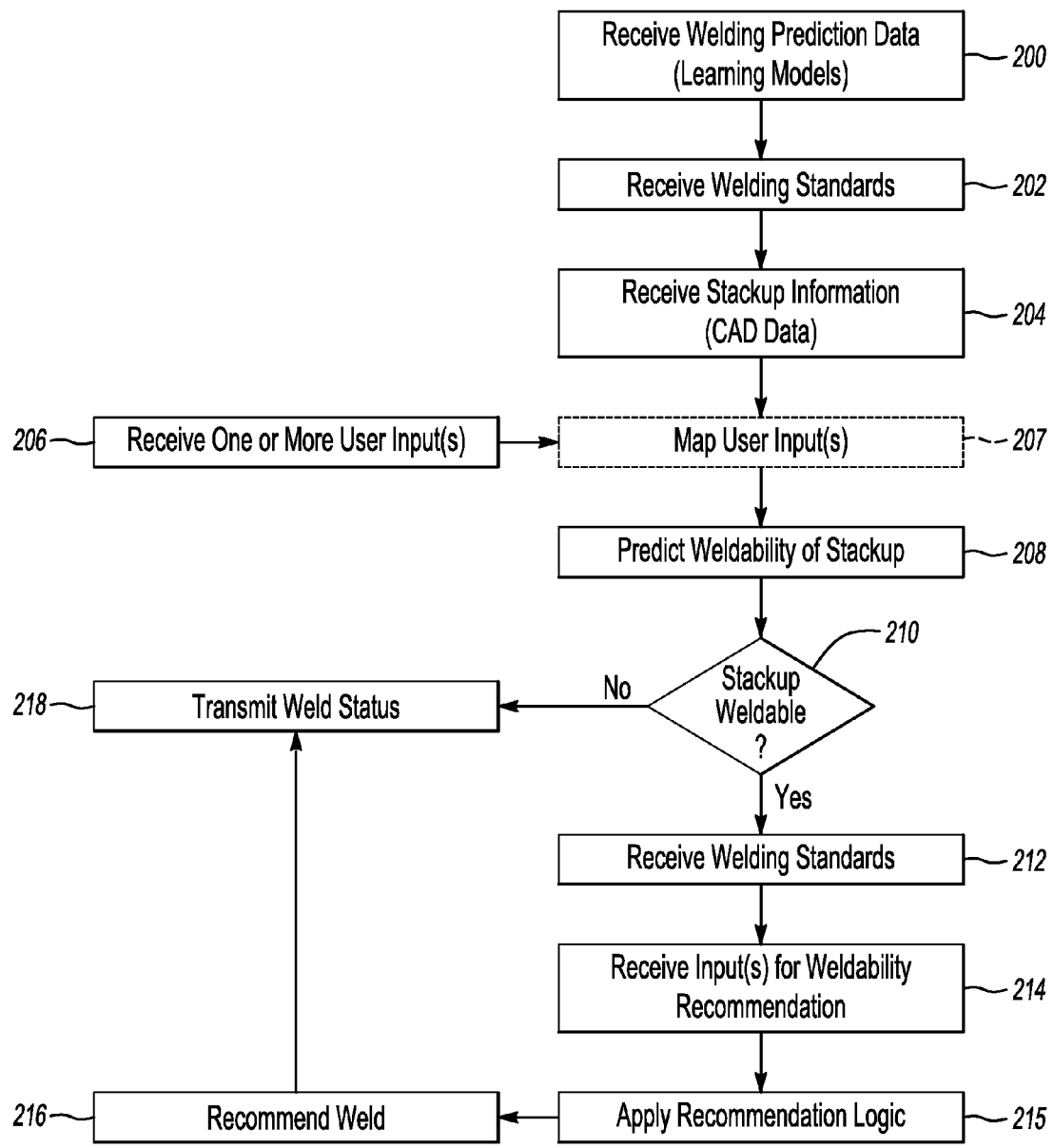
FIG. 2 illustrates a weldability determination operation according to one of the various embodiments.

FIG. 2 illustrates the weldability prediction and recommendation process according to one of the various embodiments. It should be understood that the arrangement of data flow represented in FIG. 2 is illustrative. The arrangement may be modified and rearranged without departing from the scope of the various embodiments of the invention.

As illustrated in block 200, welding prediction data (from database 104c) and, as illustrated in block 202, welding standards (from database 104b) may be received. The welding standards may be standards or rules defined by an OEM (e.g., a vehicle manufacturer) for welding stackups.

Figure 3:
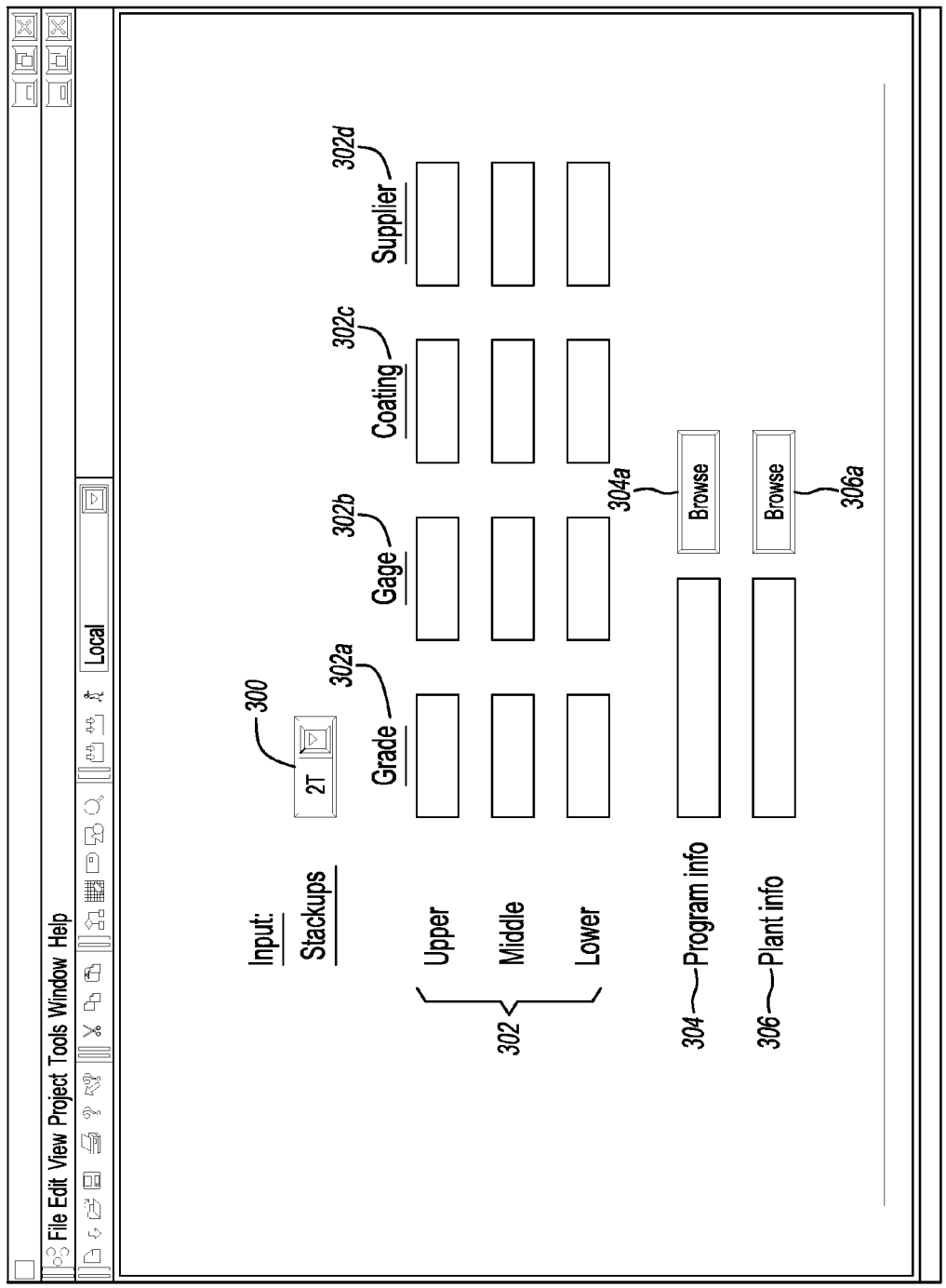
FIG. 3 illustrates an input GUI page used in a weldability determination according to one of the various embodiments.

The welding standards may be defined according to each vehicle program. Thus, in one embodiment, vehicle program information may be an additional input received by server 108. Vehicle program information may be a user input (FIG. 3). Non-limiting examples of vehicle program information may include the vehicle type and the year of the vehicle.

As illustrated in block 204, data relating to one or more stackups may also be received. The stackup data may be received as one or more graphical models and include information relating to the stackups. For example, and without limitation, the models may be computer-aided design (CAD) models or computer-aided engineering (CAE) models. The stackup data may serve as the test data for the prediction engine(s) 110 (or artificial neural network) to "learn" and make weldability predictions. For example, upon receiving the stackup data (stored in database 104a) in response to a user input (FIG. 3), weldability server 108 may utilize the received stackup data as a baseline (or test data) for predicting the weldability of a stackup defined by the user (i.e., based on the user-input design variables).

Weldability predictions and weld process schedule recommendations may be based on, in part, one or more user inputs. Thus, a user may input information for weldability predictions and weld process schedule recommendations (e.g., to a GUI page) as illustrated in block 206. FIG. 3 illustrates such a page where a user may input this information. It should be understood that the arrangement of the GUI pages in this disclosure are exemplary. The pages may be modified and reformatted without departing from the scope of the various embodiments of the invention.

In FIG. 3, GUI field 300 may be an input field for entering stackup data. For example, a user may input the thickness of the stackup (e.g., and without limitation, 2T or 3T). Based on the thickness, a lookup may occur at database 104a and stackup data associated with the input may be retrieved and received. As mentioned above, this stackup data may serve as "test" data for making the weldability prediction.

In GUI field(s) 302, the one or more design variables for each layer (i.e., upper, middle, lower) of the stackup may be received as input. The design variables, which are illustrative, are represented by call out numbers 302a-d.

A general user may input values defining the one or more design variables 302a-d for one or more layers. For example, a general user may input DP 600 for the grade 302a, 1.2 mm for the gauge 302b, 60g60g-HD for the coating 302c, and/or "Supplier A" for the supplier 302d. The values may be entered using methods known in the art including, but not limited to, inputting the values into a text box or using one or more drop down menus. It should be understood that these values are non-limiting. Other values known in the art may be entered for these design variables.

In GUI field 304, program information may be entered. As described above, the weldability standards retrieved and/or received from database 104b may be based on the vehicle program information. In one embodiment, since the vehicle program information may be stored (e.g., in a database), the vehicle program information may be retrieved and/or received from electronic storage in response to selecting the "Browse . . . " button 304a, as is known in the art.

Plant information may also be entered in GUI field 306. Plant information may also be retrieved by a user from electronic storage. Accordingly, access to plant information may be accomplished in a similar fashion by selecting "Browse . . . " button 306a.

Various constraints may be utilized in predicting weldability and/or recommending welds. A non-limiting example of such a constraint is the plant information. Based on requirements and limitations defined in these constraints, the utility of the weldability predictions and/or recommendations may increase for the OEM.

Plant data used in weldability predictions may be stored in welding prediction database 104c and received by prediction engine(s) 110. Non-limiting examples of such plant data may include weld quality data, optimal process parameters and maintenance data from the welding station (e.g., tip dressing and tip replacement). The plant data may be received in "real time" and/or in predetermined time increments (e.g., via updates performed nightly).

Plant data used in weldability recommendations may be stored in the welding standards database 104b and received by the reporting engine 112 during, for example, the recommendation process (as described below). A non-limiting example of plant data used in weld process schedule recommendation(s) may include the resources of the plant such as welding equipment available. Based on the resources of a particular plant, particular welds may or may not be recommended as part of a weld process schedule.

Referring back to FIG. 2, once the entered information has been submitted by the user (e.g., by selecting a "submit" button from the GUI, as is known in the art), the input data may be transmitted to the weldability server 108 for processing by the prediction engine(s) 110. Accordingly, the weldability of a stackup may be predicted as illustrated in block 208. The output from the prediction may be a results page exemplified in FIG. 5 (described in further detail below).

In one embodiment, the user inputs may be mapped as illustrated in block 207. For example, the design variables input by the user in GUI field 302 (FIG. 3) may be mapped to physical property variables. As described above, the mapping step may occur in order to generate more robust results from the prediction engine(s) 110 (or artificial neural network). Thus, the mapping step may or may not occur depending on the needs of the user and the OEM.

FIGS. 4A and 4B illustrate the weldability prediction process occurring at weldability server 108 according to two non-limiting embodiments. FIG. 4A illustrates the weldability prediction operation without mapping of user inputs. FIG. 4B shows the weldability prediction operation in which user inputs are mapped.

Referring to FIG. 4B, one or more of the design variables may be received upon submission by the user from the GUI page, as illustrated in block 400. The welding standards and the design variables may be applied to the stackup information (i.e., the CAD models) as illustrated in block 402. In one non-limiting embodiment, step 402 may be performed by the prediction engine(s) 110.

Stackup information may be generated as illustrated in block 404 based on step 402. The stack up information may be standardized. As illustrated in block 406, predictive logic may be applied to the stack up information. In one embodiment, the stackup information may be received by an additional prediction engine in order to generate the prediction(s). In an additional embodiment, where the weldability prediction system is an artificial neural network, application of the predictive logic to the standardized stackup information may occur in a hidden layer.

One or more weldability predictions may be obtained as illustrated in block 408 as result of the application step 406.

As shown in FIGS. 4A and 4B, and further described below with respect to FIG. 2, a determination may be made as to the weldability of the stackup, based on the prediction, for purposes of recommending a weld as illustrated in block 210. The weldability prediction may be transmitted to the reporting engine 112 for performing weld process schedule recommendation(s).

If the weldability prediction indicates that the stackup is weldable, then one or more weld process schedule recommendations may be generated for the stackup as illustrated in block 216. The recommended weld process schedule may be transmitted as illustrated in block 218.

If the stackup is predicted not to be weldable, the weld status may be transmitted without making a weld process schedule recommendation as illustrated in block 218. The weld status may be displayed to a general user at terminal 102c.

FIG. 4B illustrates an additional embodiment of the weldability prediction process in which the user inputs may be mapped. The physical property variables may be fed to one or more weldability server 108 engines (e.g., the mapping engine 114) as illustrated in block 500. The physical property variables may, for example, be programmed to mapping engine 114 or received from a database storing the physical variable values (not shown).

The design variables may be received upon the user submitting the design variables as illustrated in block 400. At (or soon after) receipt, the design variables may be mapped to the physical property variables as illustrated in block 502.

As illustrated in block 504, the welding process variables may be generated based on the user input(s). In one embodiment, the welding process variables may be generated based on the mapped physical property variables. Prediction engine(s) 110 may include programmed instructions for generating the process variables from the physical property variables. In one embodiment, welding standards, including the welding process standards, may be received from database 104b. The prediction engine(s) 110 may generate the process variables according to the welding process standards and based on the physical property variables.

The physical property variables and the process variables may be utilized as inputs for making the weldabilty prediction(s) as illustrated in block 506. For example, and without limitation, the physical property variables and process variables may be input to a second prediction engine 110 which may further process the data to generate a weldability prediction.

The physical and process variables and the welding standards may be applied to the stackup information as illustrated in block 508. Standardized stackup information may be generated, as illustrated in block 510, based on the application step 508.

The predictive logic may be applied to the standardized stackup information as illustrated in block 512. A weldability prediction may be obtained from the application of the predictive logic as illustrated in block 514. In one embodiment, the weldability prediction is comprised of response variables that serve as inputs to the weld process schedule recommendation process.

A determination may be made as to the weldability of the stackup, based on the prediction, for purposes of recommending a weld as illustrated in block 210. The weldability prediction may be transmitted to the reporting engine 112 for performing a weld process schedule recommendation.

If the weldability prediction indicates that the stackup is weldable, then a weld process schedule recommendation may be made for the stackup as illustrated in block 216. The recommended weld process schedule may be transmitted as illustrated in block 218.

If the stackup is predicted not to be weldable, the weld status may be transmitted without making a weld process schedule recommendation as illustrated in block 218. The weld status may be displayed to a general user at terminal 102c.

Referring back to FIG. 2, further details of the recommendation process will now be described. If the stackup is weldable, the welding standards may be received for making the weld process schedule recommendation as illustrated in block 212. As illustrated in block 214, one or more weld process schedule recommendation inputs may be received. In one embodiment, the response variables generated in the prediction process (as described above) may be received as the one or more inputs.

Recommendation logic (e.g., an algorithm programmed to reporting engine 112) may be applied to the welding standards and the recommendation inputs (or response variables) as illustrated in block 215. Based on the result of the recommendation logic, a weld process schedule may be recommended as illustrated in block 216. The recommended weld process schedule may then be transmitted as illustrated in block 218. The recommendation may be displayed to the general user at terminal 102c.

If the stackup in not weldable, a weld process schedule recommendation may not be made for the stackup. Instead, the weldability prediction may be transmitted to the user (e.g., the stackup in not weldable) as illustrated in block 218. The status may be displayed to the general user at terminal 102c.

Figure 5:
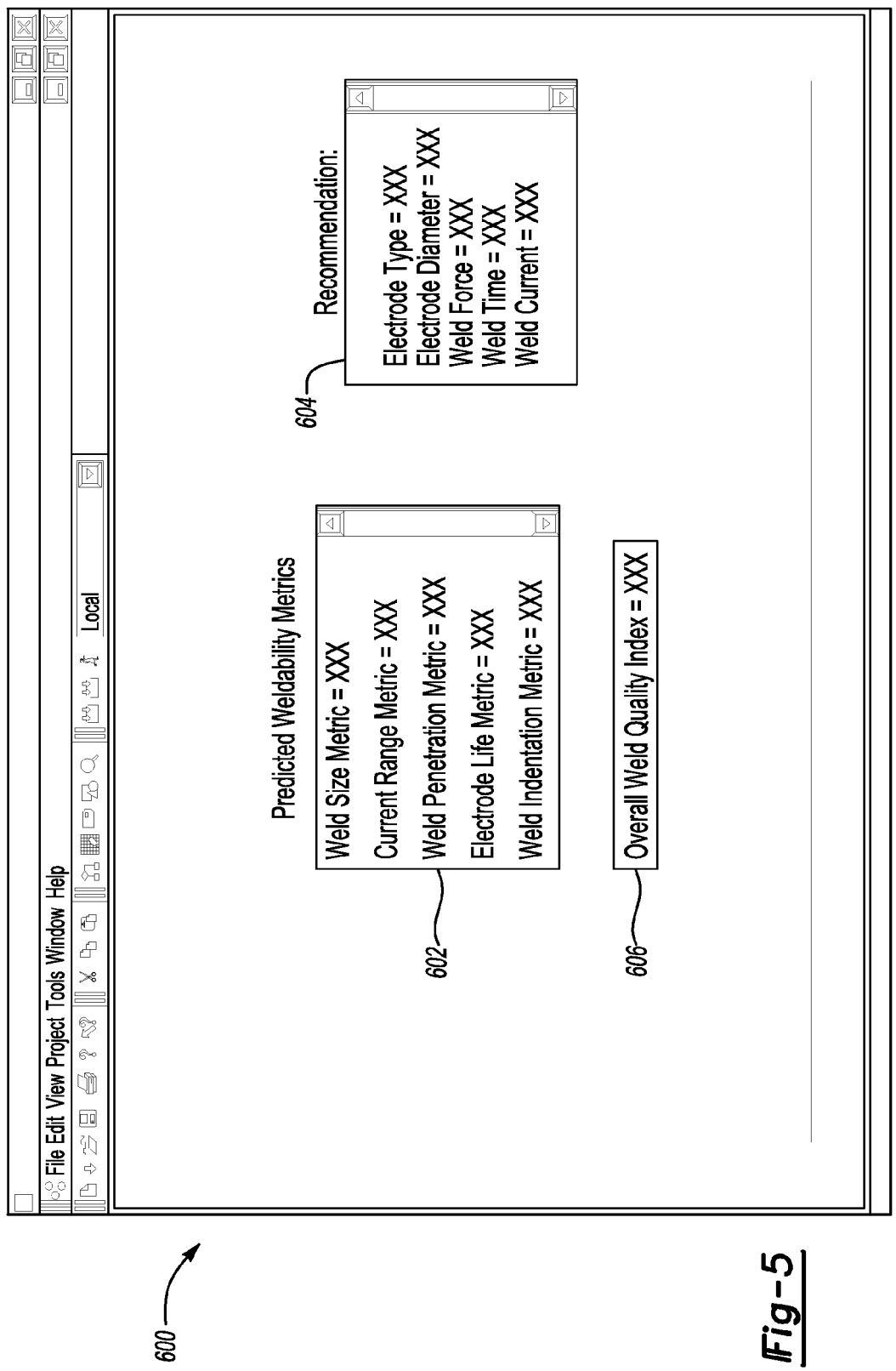
FIG. 5 illustrates a results GUI pages used in a weldability determination according to one of the various embodiments.

FIG. 5 illustrates an output page of the predicted weldability metrics and the weld recommendations. The output page may be a graphical user interface (GUI) page as illustrated in FIG. 5. Metrics 602 may include one or more values (e.g., and without limitation, numeric, alphanumeric, etc.) representing the one or more weldability predictions (i.e., response variables). As described above, one or more of metrics 602 may be used in determining one or more weld process schedule recommendation(s) 604.

In one embodiment, an overall weld quality index 606 may be displayed on the GUI 600 as represented in FIG. 6. The overall weld quality index 606 may be one or more values (e.g., and without limitation, a numeric value) determined based on the one or more response variables. Accordingly, weld quality index 606 may signify the quality of the weld based on the prediction. The weld quality index 606 may or may not be a mathematical determination based on the response variable value(s).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented method for determining a weldability of a plurality of layers of materials forming a stack-up for use in vehicle part production, the computer-implemented method comprising:
    receiving general stack-up information;
    receiving welding standards data for welding together a plurality of materials forming a stack-up;
    receiving one or more inputs defining one or more design variables of the one or more stack-ups;
    generating standardized stack-up information based on the general stack-up information, the one or more design variables, and the welding standards data;
    filtering the standardized stack-up information by using the one or more inputs defining one or more design variables;
    receiving historical welding data for predicting a weldability of the stack-up;
    applying predictive logic to the filtered standardized stack-up information based on the historical welding data to obtain one or more predictions on the weldability of the stack-up; and
    transmitting the one or more weldability predictions of the stack-up for use in vehicle part production.

2. The computer-implemented method of claim 1 wherein generating the standardized stack-up information further comprises converting the one or more design variables to one or more physical property variables.

3. The computer-implemented method of claim 2 wherein the physical property variables are selected from the group consisting of yield strength, modulus, chemical composition, thermal composition, heat capacity, surface resistivity, bulk resistivity, surface coating material, and surface coating thickness.

4. The computer-implemented method of claim 1 wherein the applying step further comprises generating one or more welding process variables based on the historical welding data.

5. The computer-implemented method of claim 4 wherein the one or more welding process variables are selected from the group consisting of weld force, weld time, weld current, controller type, electrode type, and electrode diameter.

6. The computer-implemented method of claim 1 further comprising:
    receiving one or more inputs for recommending one or more weld process schedules for the stack-up based on the one or more weldability predictions; and
    recommending the one or more weld process schedules based on the one or more inputs and the welding standards data.

7. The computer-implemented method of claim 6 wherein the applying step includes generating one or more weldability prediction variables, wherein the one or more inputs for recommending one or more weld process schedules are the one or more weldability prediction variables.

8. The computer-implemented method of claim 7 wherein the one or more weldability prediction variables are selected from the group consisting of weld force, indentation, hardness, strength, fatigue and electrode life.

9. The computer-implemented method of claim 6 wherein the recommending step further comprises reporting one or more weld process schedule recommendations.

10. The computer-implemented method of claim 9 further comprising determining a weld quality index based on the one or more weldability predictions, wherein the reporting step further comprises reporting the weld quality index.

11. The computer-implemented method of claim 1 wherein the general stack up information is one or more general CAD models of stackups and wherein the standardized stackup information is one or more standardized CAD models of the stackups.

12. The computer-implemented method of claim 1 wherein the one or more design variable inputs are user inputs.

13. The computer-implemented method of claim 12 wherein the one or more design variables are selected from the group consisting of grade, gauge, coating, supplier, and number of stack-up layers.

14. A computer-implemented system for determining a weldability of a plurality of layers of materials forming a stack-up for use in vehicle part production, the computer-implemented system comprising:
    at least one computer configured to:
        receive general stack-up information;
        receive welding standards data for welding together a plurality of materials forming a stack-up;
        receive one or more inputs defining one or more design variables of the one or more stack-ups;
        generate standardized stack-up information based on the general stack-up information, the one or more design variables, and the welding standards data;
        filter the standardized stack-up information by using the one or more inputs defining one or more design variables;
        receive historical welding data for predicting a weldability of the stack-up;
        apply predictive logic to the filtered standardized stack-up information based on the historical welding data to obtain one or more predictions on the weldability of the stack-up; and
        transmit the one or more weldability predictions of the stack-up for use in vehicle part production.

15. The computer-implemented system of claim 14 further comprising a historical welding database for storing the historical welding data, wherein the at least one computer is further configured to received the historical welding data from the historical welding database.

16. The computer-implemented system of claim 14 wherein the historical welding data comprises one or more learning models.

17. The computer-implemented system of claim 14 wherein the historical welding data further comprises data from one or more manufacturing plants.

18. The computer-implemented system of claim 17 wherein the data from the one or more manufacturing plants includes at least one of weld quality data, optimal process parameters, weld equipment data, or welding tip maintenance data.

19. A method comprising:
    receiving general stack-up information, welding standards data, physical property variable inputs for a stack-up, and historical welding data for making a weldability prediction;

generating standardized stack-up information based on the inputs from the receiving step;

filtering the standardized stack-up information based on one or more design variables;

applying predictive logic to the filtered standardized stack-up information to obtain one or more weldability predictions; and transmitting the weldability predictions for use in part production.

20. The method of claim 19 wherein the physical property variable inputs are generated from one or more design variables input by a user.

21. The method of claim 19 wherein the generating step further includes generating one or more welding process variables based on the inputs from the receiving step.

* * * * *